(12) United States Patent
Veldhoen (10) Patent No.: US 11,378,120 B2
(45) Date of Patent: Jul. 5, 2022

(54) SELF-TAPPING SCREW

(71) Applicant: PARTNERSHIP TWELLO B.V., Rotterdam (NL)

(72) Inventor: George Gustaaf Veldhoen, Rotterdam (NL)

(73) Assignee: PARTNERSHIP TWELLO B.V., Rotterdam (NL)

( * ) Notice: Subject to any disclaimer, the term of this patent is extended or adjusted under 35 U.S.C. 154(b) by 181 days.

(21) Appl. No.: 16/611,738

(22) PCT Filed: May 7, 2018

(86) PCT No.: PCT/NL2018/050297
§ 371 (c)(1),
(2) Date: Nov. 7, 2019

(87) PCT Pub. No.: WO2018/208149
PCT Pub. Date: Nov. 15, 2018

(65) Prior Publication Data
US 2020/0109735 A1   Apr. 9, 2020

(30) Foreign Application Priority Data

May 8, 2017 (NL) .................................... 2018866

(51) Int. Cl.
*F16B 25/00* (2006.01)
*F16B 33/00* (2006.01)
(Continued)

(52) U.S. Cl.
CPC ........ *F16B 33/006* (2013.01); *B29C 45/2618* (2013.01); *F16B 25/0057* (2013.01);
(Continued)

(58) Field of Classification Search
CPC ................ F16B 33/006; F16B 25/0057; F16B 25/0073; F16B 25/0026; B29C 45/2618; B29K 2077/00; B29K 2309/08
(Continued)

(56) References Cited

U.S. PATENT DOCUMENTS 924,273 A * 6/1909 Rehse ................... F16B 25/103
411/386
2,165,149 A 7/1939 Olson
(Continued)

FOREIGN PATENT DOCUMENTS

DE    102013109987 A1   3/2015
EP      1881209 A1      1/2008
(Continued)

OTHER PUBLICATIONS

International Search Report and Written Opinion, dated Aug. 22, 2018, from corresponding PCT application No. PCT/NL2018/050297.

*Primary Examiner* — Gary W Estremsky
(74) *Attorney, Agent, or Firm* — Nixon & Vanderhye (57) ABSTRACT

A self-tapping screw made of synthetic material has a threaded shank defining a screw center line. The screw has proximal and distal insertion ends, the shank including first and second portions, the second proximal to the first. The pitch is the same in the first and second portions, and has a complete thread cross-section in the second portion. In the first portion, in the direction of the thread, the thread is divided into segments having an incomplete thread cross-section, the thread segments having leading end and trailing ends. The leading end of one thread segment extends further radially than the leading end of the thread segment preceding it and forms a cutting edge. In most of the thread segments the thread top in question, for substantially its full (Continued)

length, starting with the leading end, considered in thread direction, is situated at a constant radial distance from the center line.

21 Claims, 4 Drawing Sheets

(51) Int. Cl.
 *B29C 45/26* (2006.01)
 *B29K 77/00* (2006.01)
 *B29K 309/08* (2006.01)
(52) U.S. Cl.
 CPC ...... *F16B 25/0073* (2013.01); *B29K 2077/00* (2013.01); *B29K 2309/08* (2013.01); *F16B 25/0026* (2013.01)
(58) Field of Classification Search
 USPC .................................................. 411/386, 418
 See application file for complete search history.

(56) References Cited

U.S. PATENT DOCUMENTS

| | | | | |
|---|---|---|---|---|
| 2,278,411 | A * | 4/1942 | Braendel | F16B 25/0078 411/386 |
| 3,056,234 | A * | 10/1962 | Nelsson | F16B 35/048 52/363 |
| 4,673,323 | A * | 6/1987 | Russo | F16B 25/0021 408/222 |
| 6,065,919 | A * | 5/2000 | Peck | F16B 25/0021 411/387.1 |
| 6,530,731 | B2 * | 3/2003 | Wheeler | F16B 37/127 411/178 |
| 8,511,958 | B2 * | 8/2013 | Chang | F16B 25/103 411/387.1 |
| 8,529,178 | B2 * | 9/2013 | Dayton | F16B 25/0084 411/386 |
| 8,647,038 | B2 * | 2/2014 | Gong | F16B 25/103 411/386 |
| 8,926,249 | B2 * | 1/2015 | Lin | F16B 25/0057 411/386 |
| 9,055,986 | B1 * | 6/2015 | Whipple | A61B 17/8625 |
| 9,838,807 | B2 * | 12/2017 | Jinton | A61B 17/8615 |
| 2011/0094071 | A1 | 4/2011 | Veldhoen | |
| 2013/0058735 | A1 | 3/2013 | Yu | |
| 2016/0186795 | A1 * | 6/2016 | Schneider | F16B 25/0021 411/386 |
| 2016/0223006 | A1 | 8/2016 | Hettich | |

FOREIGN PATENT DOCUMENTS

| | | |
|---|---|---|
| TW | M446240 U | 2/2013 |
| WO | 2009142500 A1 | 11/2009 |

* cited by examiner

SELF-TAPPING SCREW

BACKGROUND OF THE INVENTION

The invention relates to a self-tapping screw. The invention further relates to a method for forming such a screw. The invention further relates to an assembly of a self-tapping screw and a piece of work.

Self-tapping screws are generally known, and for instance are used in house-construction, in commercial and industrial building and in the shipbuilding industry for pleasure cruising, in particular for yachts.

In harsh conditions, such as in areas near the sea or at sea, high demands are placed on the strength and corrosion resistance of the used screws. Self-tapping screws, having a thread that increases in height from the distal (insertion) end and formed out of stainless steel, may not always be suitable due to possible galvanic corrosion. Stainless steel may also impose limits on the achievable color schemes.

Self-tapping screws of synthetic material are used for connection to construction parts of unreinforced synthetic material, such as the Ejot Delta PT P. Such self-tapping screws having a thread that increases in height from the distal (insertion) end substantially work using radial displacement of the material of the construction part. They are less suitable for a reliable connection with construction parts made of hard materials, such as for instance a reinforced polyester boat deck. In that case, the material in which the screw hole has to be tapped, will be harder than the material of the screw

SUMMARY OF THE INVENTION

It is an object of the invention to provide a self-tapping screw made of synthetic material that is suitable for use in hard materials.

It is an object of the invention to provide a self-tapping screw that is suitable for transmitting high forces in aggressive conditions.

It is an object of the invention to provide a self-tapping screw that is suitable for marine conditions.

It is an object of the invention to provide a self-tapping screw which, at least as regards the head, has a large degree of freedom in design and coloring.

It is an object of the invention to provide a method for manufacturing a self-tapping screw made of synthetic material.

According to one aspect, the invention provides a self-tapping screw made of synthetic material, having a shank on which a thread is formed, which shank defines a screw center line, wherein the screw has a proximal end and a distal insertion end, wherein the shank comprises a first portion and a second portion, wherein the second portion is situated proximal relative to the first portion, in particular connects to the first portion, wherein the thread has the same pitch in the first and second portions, wherein the thread has a complete thread cross-section in the second portion, wherein in the first portion, in the direction of the thread, the thread is divided into thread segments having an incomplete thread cross-section, wherein the thread segments have a leading end and a trailing end, wherein relative to the screw center line, the leading end of the one thread segment extends further in radial direction than the leading end of the thread segment preceding it and forms a cutting edge, and wherein in at least the majority of the thread segments the thread top in question, for at least substantially its full length, starting with the leading end, when considered in thread direction, is situated at a constant radial distance from the screw center line.

In that way it can be promoted that the material of the construction part that is being tapped in is cut loose, using the cutting edge. Torque in the shank arising while tapping, can remain limited and the gripping force yielded by the fastened screw can be enhanced. Furthermore, the stability of the screw may thus be enhanced during tapping. Placing the self-tapping screw, for instance in pieces of work made of thermo-setting materials, may thus be facilitated. The area of the thread top situated at a constant radial distance from the screw center line may then, counting from the leading end, in thread direction, cover the full length of the thread segment in question, at least almost the full length, that means up to at least almost the trailing end of said thread segment.

In one embodiment the stepwise increase of the radial distance of the thread top at the location of the leading ends of the consecutive thread segments is the same each time, so that a stepwise, evenly increasing cutting effect can be achieved.

The thread segments situated next to each other in axial direction, may define thread fields in between them, wherein for at least the majority of the thread fields, when considered in a direction parallel to the said thread direction, having a proximal directional component, the radial distance of the thread field in question to the screw center line at least remains the same each time (so may increase), preferably, however is constant.

In a further elaboration thereof, in the first portion a number of the thread fields situated closest to the distal end are situated on a conoid of a cone converging in distal direction, the cone having a circular base and a cone center line coinciding with the screw center line, wherein the conoid is at an angle of a maximum of a few degrees to the screw center line. This promotes the discharge of loosened material.

In a further elaboration, when considered in a direction parallel to the thread direction for thread fields that are consecutive to each other, the radial distance of the one thread field to the screw center line exceeds the radial distance of the thread field preceding it to the screw center line, wherein the increase is smaller than the increase of the radial distance of the thread tops at the location of the leading ends of the thread segments to the screw center line.

In the second portion, the thread may be continuous in thread direction, at least in a portion connecting to the proximal end of the thread.

In one embodiment, in the second portion the thread defines thread fields between consecutive windings, which thread fields are situated on a straight circle-cylindrical plane.

In the second portion, the thread may be continuous, and the thread fields may define a continuous helical thread field.

In one embodiment, in the first portion at least a number of thread fields that are situated closest to the second portion are situated on the same circle-cylindrical plane as the thread fields in the second portion. In a further development thereof, at least substantially all thread fields in the first portion are situated on the same circle-cylindrical plane as the thread fields in the second portion. This may be all thread fields in the first portion, or substantially all thread fields, with the exception of one or more of the thread fields that are situated closest to the distal end of the shank.

In a further development of the screw according to the invention, the leading ends of the thread segments form at least one group of cutting surfaces, which cutting surfaces are situated in one leading plane that is parallel to the screw center line. The leading plane may contain the screw center line. The leading ends of the thread segments may form two or more groups of cutting surfaces, which cutting surfaces per group are each time situated in one leading plane that is parallel to the screw center line, wherein the leading planes, when considered in circumferential direction, are arranged in a regularly distributed fashion, when considered in projection/cross-sectional planes perpendicular to the screw center line, wherein in particular two leading planes are situated in one common plane. This may be advantageous in manufacturing the screw, in an injection mold, which may in particular be divided at the location of the said common plane, wherein the sharp cutting edges can be formed at the leading ends.

In a further development of the screw according to the invention, the trailing ends of the thread segments form at least one group of end surfaces, which end surfaces are situated in one trailing plane that is at least substantially parallel to the screw center line. In distal direction, the trailing plane may converge relative to the screw center line at an angle of a maximum of a few degrees. Each trailing plane can, when considered in planes of projection/cross-section perpendicular to the screw center line, each time include obtuse angles, preferably right angles with the leading plane consecutive thereto. In radial direction, the trailing plane may be spaced apart from the screw center line, thus not containing the center line. The trailing ends of the thread segments may form two or more groups of end surfaces, which end surfaces per group are each time situated in one trailing plane, wherein the end surfaces are arranged in a regularly distributed fashion in circumferential direction, when considered in projection/cross-sectional planes perpendicular to the screw center line.

Discharging cut out material can be improved, if between trailing and leading planes that are consecutive to each other in thread direction a recess extending in a direction parallel to the screw center line is formed, which recess is bounded by the trailing and leading planes in question, wherein the trailing and leading planes extend up into the body of the shank. In that way the discharge of loosened material can be further improved. The recess may continue into the second portion. The recess forms a deepening relative to both connecting thread segments and connecting thread fields.

According to further developments, one or more of the following measures may have been taken.

An urging away of material during the tapping process is further counteracted if the incomplete thread cross-sections of the thread segments are congruent to the corresponding portions of the thread cross-section of the second portion. In other words: when considered in cross-section, the incomplete thread cross-sections—as regards their own cross-sectional surface—fit on the complete thread cross-sections of the second portion.

The thread segments may have a top angle that equals that of the thread in the second portion.

In one embodiment of the thread with in the first and second portions proximal flanks on the proximal side and distal flanks on the distal side, when considered in a longitudinal plane of cross-section containing the screw center line, the angle of the proximal flanks relative to the screw center line can be constant, and/or, when considered in a longitudinal plane of cross-section containing the screw center line, the angle of the distal flanks relative to the screw center line can be constant. The angle for the proximal flanks can then equal the one for the distal flanks.

An urging away of material during the tapping process is further counteracted if in a straight-circular cylinder plane, the center line of which contains the screw center line and which plane intersects the thread, the distance between the intersections of the distal and proximal flanks of the thread is constant in the first and second portions.

In one embodiment, when considered in planes of longitudinal cross-section in which the screw center line is situated, the flat thread tops of the thread segments in the first thread portion extend parallel to the screw center line. The same may be then the case for the flat thread tops of the thread in the second portion.

As noted above, the screw can be manufactured using an injection molding process. This provides a broad choice in color and materials, geared to the intended use. For tapping in relatively hard materials, the screw may be manufactured of a fiber-reinforced synthetic material, in particular fiberglass-reinforced. For instance, fiber-reinforced synthetic material having a minimum of 30 wt. % of fiber material is possible, or a fiber-reinforced synthetic material having a minimum of 50 wt. % of fiber material, or a fiber-reinforced synthetic material having a minimum of 60 wt. % of fiber material.

The basic material may be a thermoplastic synthetic material, such as a polyamide, in particular polyarylamide.

Possibly, that using a screw according to the invention, grindings in the contact area between the surface of the thread segment and the material of the construction part, in the area trailing to the leading end, may enhance the formation of the thread.

In the screw to be used according to the invention, the material of the thread segment in question in (proximal) thread direction, up to the trailing end, is situated on/within the contour of the leading end/cutting edge.

In an embodiment suitable for pleasure craft, a screw according to the invention has a head provided with a profile for engagement by a driving tool, and with an edge-shaped elevation for entering a snap connection with a snap cap or snap button or press stud, for instance of a tarpaulin. The edge-shaped elevation may in particular have a circumferential surface which at least partially diverges in proximal direction. In that way a confining action can be exerted in proximal direction on a spring that is usually incorporated in the snap cap/press stud. The edge-shaped elevation may have a circular cross-section, when considered in planes perpendicular to the screw center line. When considered in planes of longitudinal cross-section containing the screw center line, the circumferential surface may have a smooth or buckled concave course. For instance, it may show a course according to a generating line of a cone, having a cone center line coinciding with the screw center line. Other shapes are possible, such as a compound course, for instance first having a portion according to a generating line of a cylinder and in proximal direction changing into a generating line of a cone diverging in proximal direction. The screw described in this paragraph may be part of an assembly having a snap cap or snap button or press stud, designed for entering said snap connection.

According to an aspect the invention provides a self-tapping screw made of synthetic material having a shank on which a thread is formed, which shank defines a screw center line, wherein the screw has a proximal end and a distal insertion end, wherein the shank comprises a first portion and a second portion, wherein the second portion is situated proximal relative to the first portion, in particular connects to the first portion, wherein the thread has the same pitch in the first and second portions, wherein the thread has a complete thread cross-section in the second portion, wherein in the first portion, in the direction of the thread, the thread is divided into thread segments having an incomplete thread cross-section, wherein the thread segments have a leading end and a trailing end, wherein relative to the screw center line, the leading end of the one thread segment extends further in radial direction than the leading end of the thread segment preceding it and forms a cutting edge, and wherein in at least the majority of the thread segments the thread top in question, when considered in thread direction, from its leading end up to its trailing end, is situated at a radial distance from the screw center line, which distance at a leading end is constant at the most. Said radial distance may be constant or decreasing, when considered in (proximal) thread direction. In the screw to be used according to the invention, the material of the thread segment in question in (proximal) thread direction, towards the trailing end, is situated on/within the contour of the leading end/cutting edge. The aspects according to the invention stated above applicable here, including the aspects described in the claims, the contents of which must be considered inserted herein, can also be applied in this.

A portion of the thread segment in question that extends from the cutting edge and having a constant radial distance to the screw center line, may connect to a portion of said thread segment having a radial distance that decreases in proximal thread direction.

According to a further aspect the invention provides an assembly of a screw according to the invention and a piece of work (construction part) in which the screw has been screwed in a self-tapping process.

Such as for instance may be the case in a boat, the piece of work may be plate-shaped, wherein the second portion is in threaded engagement with the plate, in particular the first portion can extend beyond the plate. The plate may have been made of a thermo-setting synthetic material, in particular a thermo-setting polyester, wherein the thermo-setting synthetic material in particular is fiber-reinforced, in particular is fiberglass-reinforced.

The screw and hole into which tapping has to take place, may be geared to each other, and namely such that the piece of work has a hole for receiving the screw, wherein the hole has a radius exceeding the largest radius of the material of the screw relative to the screw center line in a distal end plane of the screw. The hole may have a radius exceeding the radial distance of the thread top at the leading end of the most distal thread segment to the screw center line. The hole may then have a radius that is smaller than the radial distance of the thread top at the leading end of the thread segment following in proximal direction to the screw center line. The hole may have a diameter exceeding the diameter of the shank of the screw. In that way the manufacturing tolerances of the hole do not need to be depended on so much.

According to a further aspect the invention provides a method for by means of injection molding manufacturing a screw according to the invention, which provides a lot of freedom in design.

As noted above, if the leading ends of the thread segments form at least one group of cutting surfaces, which cutting surfaces are situated in one leading plane that is parallel to the screw center line, use can be made of an injection mold that is partitioned according to a plane of division coinciding with the leading plane. The cutting edges will then also sit in the plane of division, as a result of which they can be configured sharp.

Advantageously, the plane of division may coincide with two diametrically opposing leading planes.

In one embodiment, the screw to be manufactured has a flange, wherein the molding material is introduced into the injection mold via a port debouching in a surface of the injection mold against which the distally oriented surface of the flange abuts during molding. In particular for fiber-reinforced materials, such an approach may be advantageous for distributing the material in the mold when filling it and for the orientation of the fibers in the synthetic molding material. The effect of post pressing in the molding process is also enhanced in that way.

The aspects and measures described in this description and the claims of the application and/or shown in the drawings of this application may where possible also be used individually. Said individual aspects and other aspects may be the subject of divisional patent applications relating thereto. This particularly applies to the measures and aspects that are described per se in the sub claims.

BRIEF DESCRIPTION OF THE DRAWINGS

The invention will be elucidated on the basis of an exemplary embodiment shown in the attached drawings, in which.

DETAILED DESCRIPTION OF THE DRAWINGS

Figure 1:
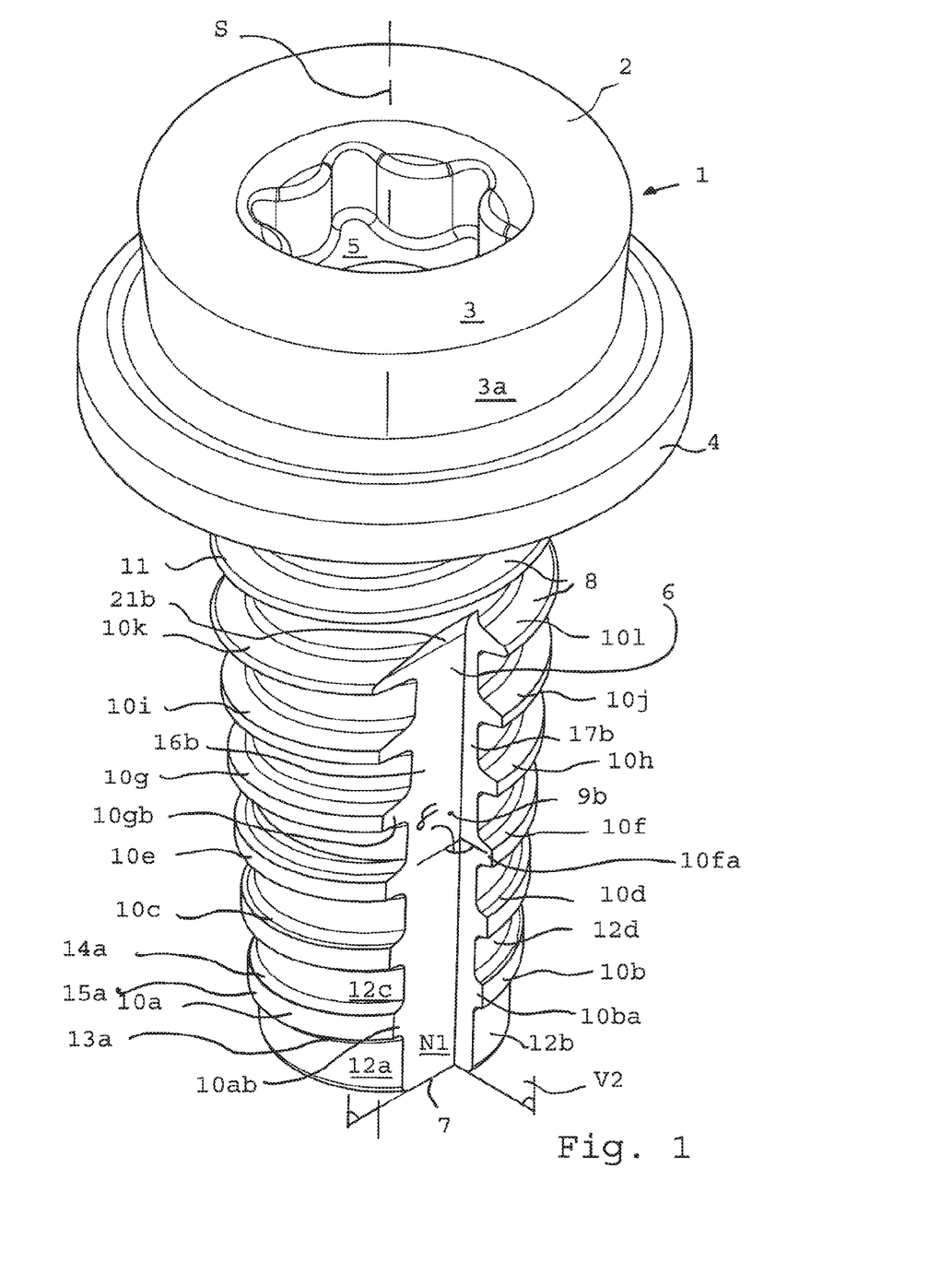
FIG. 1 shows an inclined view from the proximal side of an example of a screw according to the invention.

On the proximal side, the screw 1 in FIG. 1 has a head 2 having an edge 3 and a flange 4, wherein the edge 3 surrounds a recess 5 for a tool for rotating the screw 1. A shank 6 extends in distal direction from the flange 4, which shank has a distal end surface 7.

The shank 6 has a screw center line S and is provided with a thread 8 having a constant pitch, in which two portions can be distinguished, namely a first portion 8a in first shank portion 6a in which the thread is incomplete and divided in first thread segments 10a-10l and a second portion 8b in second shank portion 6b in which the thread 11 is complete (that means the designed operational shank cross-section for the intended attachment in a hole, along with transmission of forces that arises when being used) and is continuous from the first portion 8a to the flange 4.

The first thread segments 10a-10l are divided into two groups, namely the segments 10a,10c,10e,10g,10i and 10k and the segments 10b,10d,10f,10h,10j and 10l, respectively. The consecutive segments extend over approximately 135 degrees over the circumference of the shank 6, also see FIG. 2D.

The segments 10*a*-10*l* each time have a leading end surface 10*aa*-10*la* and a trailing end surface 10*ab*-10*lb*. The leading end surfaces 10*aa*,10*ca*,10*ea*,10*ga*,10*ia*,10*ka* sit in a common plane V1 (FIG. 2D) which also contains the screw center line S. The leading end surfaces 10*ba*,10*da*,10*fa*, 10*ha*,10*ja*,10*la* sit in a common plane V2 (FIGS. 1 and 2D) which also contains the screw center line S. The trailing end surfaces 10*ab*,10*cb*,10*eb*,10*gb*,10*ib*,10*kb* sit in a common plane N1 (FIGS. 1 and 2D) which in cross-sectional planes that are perpendicular to the center line S is each time perpendicular (see angle δ) to V1 and spaced apart from the screw center line S. The trailing end surfaces 10*bb*,10*db*, 10*fb*,10*hb*,10*jb*, 10*lb* sit in common plane N2 (FIG. 2D) which in cross-sectional planes that are perpendicular to the center line S is each time perpendicular to V2 and spaced apart from the screw center line S. The planes N1 and N2 are at a small angle γ to the center line S of approximately 1.5 degrees, descending in distal direction. Recesses 9*a*, 9*b* have been formed in the shank 6, which recesses are also bounded by shank surfaces 16*a*, 16*b*, which sit in one plane with planes N2 and N1, respectively, and shank surfaces 17*a*, 17*b*, which sit in one plane with planes V1 and V2. The recesses 9*a*, 9*b* thus form a discontinuation between thread segments that are consecutive in thread direction and the thread fields that are consecutive in thread direction. In proximal direction the recesses 9*a*, 9*b* are bounded by surfaces 21*a*, 21*b*.

Figure 2A:
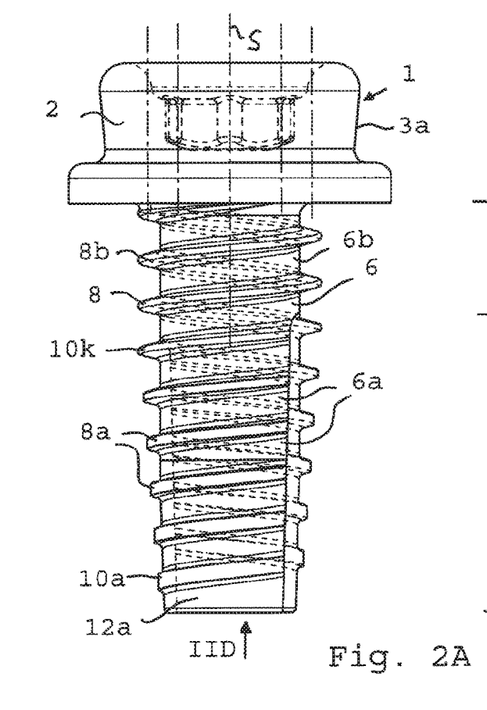
FIGS. 2A-F show a side view according to arrow IIA, a cross-section according to plane IIB-IIB in FIG. 2C, a view of the proximal end of the screw and a view of the distal end of the screw of FIG. 1, as well as a side view according to arrow IIE and a cross-section according to plane IIF-IIF in FIG. 2C, respectively.
Figure 2B:
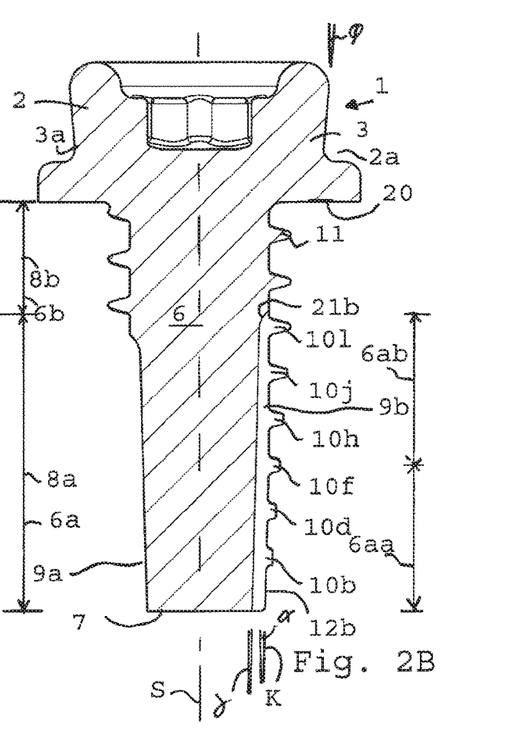
Figure 2C:
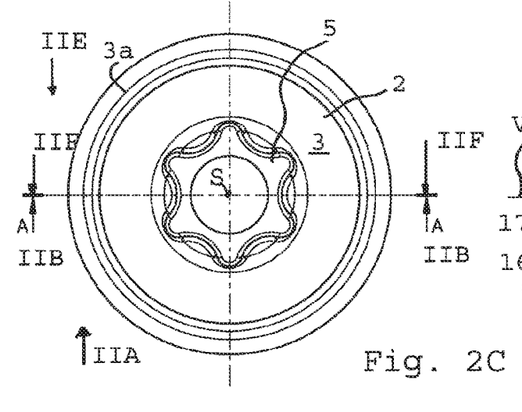
Figure 2D:
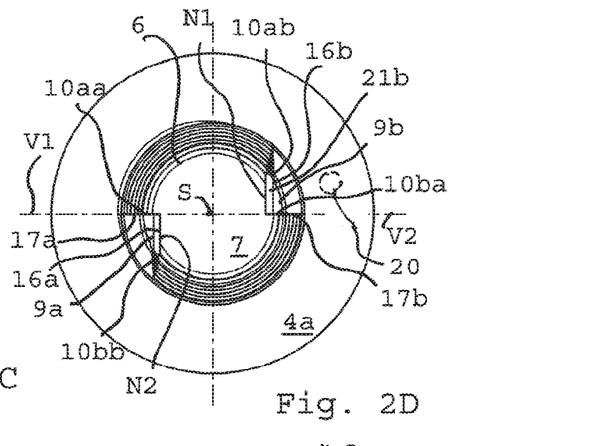
Figure 3:
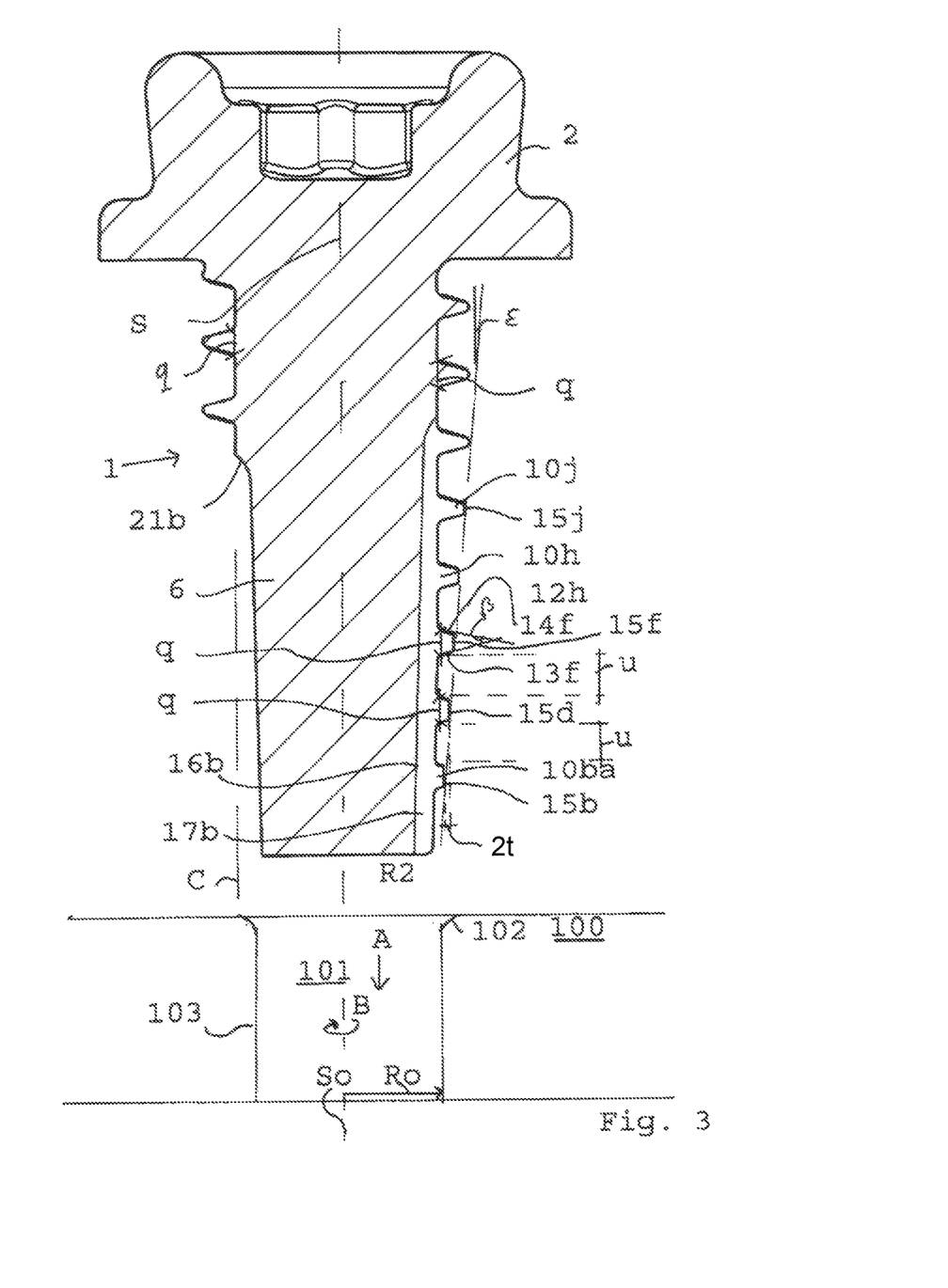
FIG. 3 shows a schematic representation of an initial stage of placing the screw of FIG. 1 in a piece of work.

Adjacent to, between the thread segments 10*a*-10*l* the shank surface forms thread fields 12*a*-12*l*, which as regards the area (shank portion 6*ab*) proximal from the leading end 10*fa* are situated on a straight circle-cylinder C, equal to the thread fields between the thread 8*b* in the second shank portion 6*b*. In the area (shank portion 6*aa*) distal from trailing end 10*eb*, the thread fields 10*a*, 10*c*, 10*e* and thread fields 10*b* and 10*d* are situated on a circle-conoid K having a cone center line that coincides with the screw center line S. The thread fields have a constant width u (FIG. 3). The angle α between conoid K and the center line S in this example is approximately 2 degrees (FIG. 2B). The portion 6*aa* extends from the distal end 7 in proximal direction and may be shorter than depicted, for instance up to the trailing end of the second thread segment 10*b*, or be virtually absent. In those cases, more or at least substantially all thread fields of the shank portion 6*ab* are in the cylindrical plane C.

The first thread segments 10*a*-10*l* in cross-section have a distal flank 13*a*-13*l*, a proximal flank 14*a*-14*l* and a flat thread top 15*a*-15*l*. The flanks include a top angle β that is constant over the thread, also see FIG. 3. In FIG. 3 it is also indicated that when considered in a longitudinal section including the screw center line S, the distance q between the flanks 13 and 14 for each thread segment 10 measured along the intersecting line with a straight circle-cylindrical plane (such as C), with the center line that coincides with the screw center line S and coincides with the shank surface (thread fields) between the threads in portion 8*b*, is the same and moreover is the same as that distance in the second portion 8*b*.

Figure 2E:
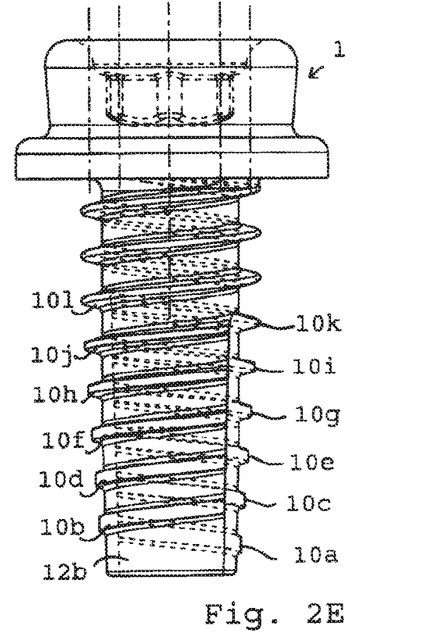
Figure 2F:
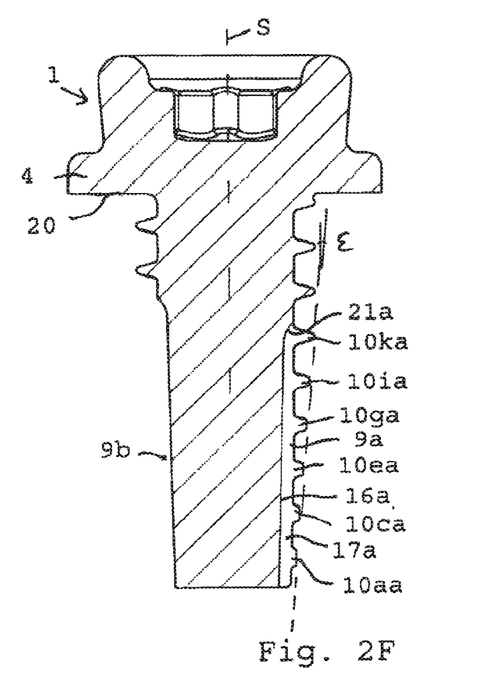

The leading end surfaces 10*aa*-10*al* of the consecutive thread segments 10*a*-10*l* with the flanks 13*a*-13*l*, 14*a*-14*l* and the thread top surfaces 15*a*-15*l* extend to a stepwise larger radial distance from screw center line S. The thread top surfaces 15*a*-15*l*, however, each time follow a respective casing of a straight circular cylinder that is concentric with the screw center line S. As a result, over the full length of the thread segment, the material of the thread segment lies in the shadow of its leading end, in other words, the leading end defines the contour of the thread segment in question in the screw to be used. The stepwise increase t of said radial distance is indicated in FIG. 3 by 2*t*, due to the two thread segments per revolution. With the 12 consecutive leading end surfaces 10*aa*-10*la* a full thread height T (FIG. 3) is achieved in twelve steps t. The distal angles of the thread tops (intersections thread tops with distal flanks) in the leading ends are positioned on a line that is at an angle ε of a few degrees, (for instance 3 degrees) to the center line S (FIG. 2F).

The screw 1 can be manufactured in an injection molding process, wherein the mold can be divided according to plane V1, V2. The synthetic material for the screw can be injected in said mold via a port situated on the distally oriented surface 4*a* of the flange 4, at the location of 20 (see FIGS. 2B and 2D).

The synthetic material for the screw can be a polyamide, preferably a polyarylamide, in particular be (fiberglass) reinforced, having a content of (glass)fibers of at least 30 wt. %, preferably at least 50 wt. %, even more preferably at least 60 wt. %. The hardness of the material of the formed screw 1 can be relatively high, at least Shore D85, preferably at least Shore D90, more preferably at least Shore D95, according to ISO 868.

The edge 3 (see FIG. 2B) has a circumferential surface 3*a* which diverges in proximal direction, according to, in this example, a conoid the center line of which coincides with the screw center line S. Here the conoid is at an angle φ of approximately 5 degrees to S. As a result, the head of this unitary synthetic self-tapping screw is suitable for cooperation with press studs or snap buttons. Because of the circumferential surface 3*a* diverging in proximal direction, a kind of bowl 2*a* (FIGS. 2B and 4) is formed in which a spring of a snap cap or press stud can be accommodated and confined in proximal direction.

When placing the screw 1, FIG. 3, in a piece of work 100, a circular hole 101 will first of all be made in there. In this case the piece of work 100 is plate, for instance a fiberglass reinforced polyester. The hole 101 has a radius Ro and a center line So. The hole 101 has a countersunk edge 102. The piece of work 100 and the screw 1 are geared to each other such, that once placed the second portion 8*b* engages over the full plate thickness in the hole wall 103. The diameter of the hole, 2×Ro, is slightly larger than the diameter of the shank in portion 8*b*. Furthermore, the radial distance R2 of the thread top 15*b* of the second thread segment 10*b* to the center line S exceeds the radius Ro of the hole 101, but the radial distance R1 (FIG. 2E) of the thread top 15*a* of the first thread segment 10*a* to the center line S is smaller than Ro. In that way the stability of the screw in the hole 101 is enhanced at the start of the placement process. Furthermore, the manufacturing tolerances of the hole need not be depended on so much: in case slightly too small a drill was used for making the hole, the distal end of the screw can still be inserted into the hole and the cutting surface of the first thread segment can be operational.

Once the screw 1 has been placed with the distal end in the hole 101 in direction A, the screw can be rotated in the direction B by using a suitable tool, such as an electric screw driver. The leading end surface 10*ba* of the second thread segment 10*b* will engage onto the edge 102 and cut away the material of the plate 100 at that location and subsequently tap a thread in the hole wall 103. Material that is cut away can escape in the recess 9*b*. After half a rotation the next leading end surface 10*ca*, of the third thread segment 10*c*, comes into engagement with the edge 102 and the hole wall 103, wherein an extra step of material is cut away, as a result of the elevation of the thread segment 10*c* by the step t.

Material that is cut away then can escape in the recess 9a. After another half-rotation the fourth thread segment 10d, in itself also elevated by step t, is next to further cut away material, and this continues until the second thread portion arrives at the edge 102 and the thread-forming process in the hole wall 103 is completed. The screw 1 can then be screwed in further until the flange 4 abuts the plate 100.

While cutting in the hole wall 103, the constant radial distance of the thread top 15a-l within a respective thread segment 10a-10l resulted in no material of the hole wall having to be urged away, which facilitates the placement, in particular in case of placement in hard materials, such as thermo-setting materials such as polyester, in particular fiberglass reinforced polyester. The said constant radial distance of the thread top may also be advantageous for a grinding action on the material of the hole wall at the location of the contact of the flanks and the thread top along the thread segment. The hardness of the material of the screw and that of the piece of work are close to each other.

Figure 4:
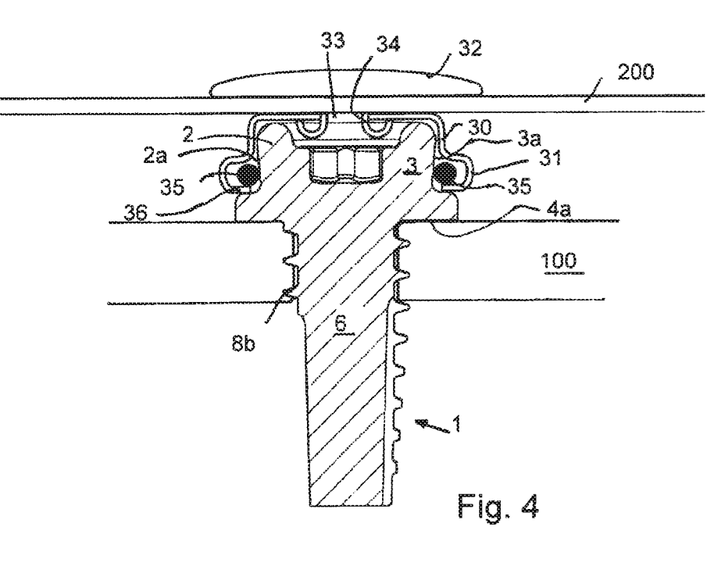
FIG. 4 shows a representation in which the screw of FIG. 1 can be seen in a situation of use as fastening member for a tarpaulin.

The depicted screw 1, together with the head 2 and the edge 4, is suitable to form a fastening location for a snap button or press stud of for instance a tarpaulin for a pleasure craft. This is schematically shown in FIG. 4, in which it can be seen that the screw 1 is fully screwed into the plate, until the flange surface 4a is placed tightly against the plate 100. The head 2 then offers room to a snap fastening of a press stud assembly 30, that is fastened to a tarpaulin 200. The press stud assembly 30 comprises a snap member 31 and a cap 32 attached thereto, both manufactured from stainless steel such as inox type 316. The cap is fastened with turned fingers or turned edge 34 through/in hole 33 of the snap member 31, while clamping the tarpaulin 200 in between it. The snap member 31 further comprises a snap spring 35. When placing the press stud assembly 30 on the head 2 of the screw 1 the snap member 31 fits over the edge 3. The spring 35 is able to deflect within the snap member 31 In the final condition shown, the bent edge 36 has ended up against the flange 4 and the spring 35 presses against the circumferential wall 3a, wherein the cone shape of the wall 3a ensures an upward confinement of the spring 35, so that the (in this case non-locking) snap/press stud connection endures.

The result is that the tarpaulin 200 is secured to the plate 100, wherein the parts for it are resistant against marine conditions. When the tarpaulin 200 is removed, the head 2 remains visible, however, during the molding process it can be given a color that renders its presence less annoying or not annoying at all.

The invention is/inventions are not at all limited to the embodiments discussed in the description and shown in the drawings. The above description is included to illustrate the operation of preferred embodiments of the invention and not to limit the scope of the invention. Starting from the above explanation many variations that fall within the spirit and scope of the present invention will be evident to an expert. Variations of the parts described in the description and shown in the drawings are possible. They can be used individually in other embodiments of the invention(s). Parts of the various examples given can be combined together.

The invention claimed is:

1. A self-tapping screw comprising:
   a shank on which a thread of constant pitch is formed, the shank and thread being made of synthetic material, which shank defines a screw center line,
   wherein the shank has a proximal end and a distal end, the distal end of the shank being a distal insertion end of the screw,
   wherein the shank comprises a first portion (6a) located on the distal end of the shank and a second portion (6b) located on the proximal side of the first portion, the second portion extending towards and connecting with the first portion of the shank,
   wherein the thread is located on both the first and second portions and has the same pitch in the first and second portions,
   wherein the thread in the second portion is continuous and has a complete thread cross-section,
   wherein the thread in the first portion is non-continuous and, in a direction of the thread towards the distal end of the shank, the thread is divided into thread segments having an incomplete thread cross-section,
   wherein the thread segments have a leading end and a trailing end, the leading end being closer to the distal end of the shank than the trailing end, the thread segments further having a distal flank, a proximal flank, and a thread top that extends between the distal flank and the proximal flank and also between the leading end to the trailing end of each thread segment,
   wherein the thread top has a radial distance from the screw center line,
   wherein relative to the screw center line, the leading end of a first thread segment extends further in radial direction than the leading end of a second thread segment, the first thread segment being located towards the proximal end of the shank with respect to the second thread segment, such that a maximum radial length of the leading end of each of the thread segments, relative to the screw center line, decreases toward the distal end of the shank, each leading end forming a cutting edge,
   wherein, for a majority of thread segments, a radial distance from the screw center line to the thread top at any location along each respective one thread segment is equal to or less than the radial distance from the screw center line to the thread top at the leading end of that respective one thread segment, so that for each respective one thread segment of said majority of the thread segments, a thread contour taken along the respective one thread segment is situated on or within the thread contour of its respective leading end.

2. The screw according to claim 1, wherein, for each of some of the at least the majority of the thread segments, the radial distance of the thread top at the trailing edge is less than the radial distance of the thread top at the leading edge, a first portion of the thread top extending between the leading edge towards the trailing edge has a radial distance equal to the radial distance of the thread top at the leading edge, and in a further portion of the thread top extending to the trailing edge, the radial distance of the thread top from the screw center line decreases in the proximal thread direction for each of the some of the at least the majority of the thread segments.

3. The screw according to claim 1, wherein, for each of some of the at least the majority of the thread segments, the radial distance of the thread top at the trailing edge is equal to the radial distance of the thread top at the leading edge.

4. The screw according to claim 3, wherein the radial distance of the thread top from the screw center line is constant in the proximal thread direction for each of the some of the at least the majority of the thread segments.

5. The screw according to claim 1,
wherein, for each thread segment, the increase of the radial distance of the thread top at the location of the leading ends of the consecutive thread segments is the same.

6. The screw according to claim 1,
wherein the thread segments situated next to each other in the axial direction, define thread fields in between them,
wherein for at least the majority of the thread fields, when considered in a direction parallel to the said thread direction, the radial distance of the thread field to the screw center line is constant.

7. The screw according to claim 6,
wherein in the first portion a number of the thread fields situated closest to the distal end are situated on a conoid of a cone converging in distal direction, the cone having a circular base and a cone center line coinciding with the screw center line, wherein the conoid is at an angle of a maximum of 2 degrees to the screw center line.

8. The screw according to claim 6,
wherein, when considered in a direction parallel to the thread direction for thread fields that are consecutive to each other, the radial distance of the one thread field to the screw center line exceeds the radial distance of the thread field preceding it to the screw center line, wherein the increase is smaller than the increase of the radial distance of the thread tops at the location of the leading ends of the thread segments to the screw center line.

9. The screw according to claim 6,
wherein the thread fields in the second portion define a continuous helical thread field.

10. The screw according to claim 1, wherein the thread in the second portion defines thread fields between consecutive windings, which thread fields are situated on a circle-cylindrical surface and define a continuous helical thread field.

11. The screw according to claim 10,
wherein in the first portion at least a number of thread fields that are situated closest to the second portion are situated on the same circle-cylindrical surface as the thread fields in the second portion, wherein at least most thread fields in the first portion are situated on the same circle-cylindrical surface as the thread fields in the second portion.

12. The screw according to claim 1,
wherein the leading ends of the thread segments form at least one group of cutting surfaces, which cutting surfaces are situated in one leading plane that is parallel to the screw center line,
wherein the leading plane contains the screw center line, wherein the leading ends of the thread segments form two or more groups of cutting surfaces, which cutting surfaces per group are each time situated in one leading plane that is parallel to the screw center line, wherein the leading planes are arranged in a regularly distributed fashion, when considered in cross-sectional planes perpendicular to the screw center line.

13. The screw according to claim 12,
wherein the trailing ends of the thread segments form at least one group of end surfaces, which end surfaces are situated in one trailing plane that is parallel to the screw center line, in distal direction at an angle converging relative to the screw center line,
wherein the trailing ends of the thread segments form two or more groups of end surfaces,
wherein the end surfaces are arranged in a regularly distributed fashion, when considered in cross-sectional planes perpendicular to the screw center line, and wherein between trailing and leading planes that are consecutive to each other in thread direction a recess extending in a direction parallel to the screw center line is formed, which recess is bounded by the trailing and leading planes, wherein the trailing and leading planes extend up into the body of the shank.

14. Method for by injection molding manufacturing a screw according to claim 12, wherein use is made of an injection mold that is partitioned according to a plane of division coinciding with the leading plane, wherein the plane of division coincides with two diametrically opposing leading planes, wherein the screw to be manufactured has a flange, wherein the molding material is introduced into the injection mold via a port debouching in a surface of the injection mold against which the distally oriented surface of the flange abuts during molding.

15. The screw according to claim 1,
wherein the trailing ends of the thread segments form at least one group of end surfaces, which end surfaces are situated in one trailing plane that is parallel to the screw center line, in distal direction at an angle converging relative to the screw center line.

16. The screw according to claim 15,
wherein each trailing plane, when considered in planes of cross-section perpendicular to the screw center line, each time includes right angles with the subsequent leading plane.

17. The screw according to claim 15,
wherein in radial direction the trailing plane is spaced apart from the screw center line.

18. The screw according to claim 15,
wherein the trailing ends of the thread segments form two or more groups of end surfaces,
wherein the end surfaces are arranged in a regularly distributed fashion, when considered in cross-sectional planes perpendicular to the screw center line.

19. The screw according to claim 1, manufactured using an injection molding process from a fiber-reinforced thermoplastic synthetic material, in particular fiberglass-reinforced, synthetic material having a minimum of 30 wt. % of fiber material.

20. Assembly of a screw according to claim 1, and a piece of work in which the screw is screwed in a self-tapping process wherein the piece of work is plate-shaped and wherein the second portion is in threaded engagement with the plate, in particular the first portion extends beyond the plate, wherein the plate is made of a thermo-setting synthetic material, in particular a thermo-setting polyester, wherein the thermo-setting synthetic material in particular is fiber-reinforced, in particular is fiberglass-reinforced.

21. Pleasure craft provided with plural of the assemblies according to claim 20.

* * * * *